(12) United States Patent
Williams et al.

(10) Patent No.: US 7,444,697 B2
(45) Date of Patent: Nov. 4, 2008

(54) TRAVEL PILLOW

(76) Inventors: Pamela Williams, 2738 Northgate Way, Acworth, GA (US) 30101; Darrio H Williams, 3738 Northgate Way, Acworth, GA (US) 30101

( * ) Notice: Subject to any disclaimer, the term of this patent is extended or adjusted under 35 U.S.C. 154(b) by 148 days.

(21) Appl. No.: 11/383,158

(22) Filed: May 12, 2006

(65) Prior Publication Data

US 2007/0261172 A1    Nov. 15, 2007

(51) Int. Cl.
*A47K 7/02* (2006.01)
(52) U.S. Cl. .................................... 5/640; 5/636; 5/630
(58) Field of Classification Search .................. 5/630, 5/636, 640, 643, 652; 4/571–576.1
See application file for complete search history.

(56) References Cited

U.S. PATENT DOCUMENTS

| | | | |
|---|---|---|---|
| 3,220,770 A | 11/1965 | Schaeffer | |
| 3,851,919 A | 12/1974 | Nagy | |
| 4,770,466 A | 9/1988 | Pesterfield | |
| 4,802,691 A | 2/1989 | Watkins | |
| 4,919,483 A | 4/1990 | Horkey | |
| 4,951,998 A | 8/1990 | McClain | |
| 4,967,429 A | 11/1990 | Vlad | |
| 4,985,950 A | 1/1991 | Gladish | |
| 5,054,855 A | 10/1991 | Williams et al. | |
| 5,140,713 A | 8/1992 | Pesterfield | |
| 5,140,716 A * | 8/1992 | Rawdon et al. | ............... 14/71.1 |
| 5,317,772 A | 6/1994 | Perl et al. | |
| 5,395,159 A | 3/1995 | Pinto | |
| 5,800,018 A | 9/1998 | Colombo et al. | |
| 6,135,560 A | 10/2000 | Fagg | |
| 2001/0042272 A1 | 11/2001 | Kontos | |
| 2005/0173962 A1 | 8/2005 | Stein et al. | |

* cited by examiner

*Primary Examiner*—Patricia Engle
*Assistant Examiner*—Fredrick Conley
(74) *Attorney, Agent, or Firm*—Advantia Law Group; Michael W. Starkweather; Jason P. Webb

(57) ABSTRACT

A pillow for coupling to a surface. The pillow includes: a first cushion of soft resilient material; a first cover enclosing the cushion; a second cover enclosing the first cover, the second cover including an edge portion having a first aperture disposed therethrough; and a suction cup assembly coupled to the first cover and disposed through the first aperture. The suction cup assembly includes: a suction cup; a release tab coupled to an edge of the suction cup; a neck; a nub coupled to the neck and having a larger dimension than a radius of the neck; a second cushion of soft resilient material disposed about the neck and between the first cover and the nub; and a rigid annular member disposed about the neck and between the second cushion and the nub, wherein the second cushion extends radially beyond the rigid annular member.

15 Claims, 3 Drawing Sheets

TRAVEL PILLOW

BACKGROUND OF THE INVENTION

1. Field of the Invention

The present invention relates to pillows, specifically to travel pillows.

2. Description of the Related Art

Travel is notoriously uncomfortable. Makers of vehicles must balance a great variety of needs when designing a vehicle, and therefore comfort is often sacrificed for economy, space, safety, etc. Accordingly, efforts have been made at making traveling more comfortable. Such efforts include chairs/seats configured with comfort features such as reclining mechanisms, headrests, heat elements, vibration elements, etc.

However, seats generally only provide a limited number of comfortable positions for a user. Accordingly, efforts have been made at creating comfort accessories to enhance passenger comfort in vehicles. The following are examples of such and are hereby incorporated by reference herein:

U.S. Pat. No. 5,800,018 by Colombo, et al. discloses a pillow is attachable to the window of an automobile or other vehicle via one or more cc suction cups. The pillow comprises a cushion portion consisting of foam rubber or other soft, resilient material, a fabric cover for the cushion that may be removable, a vertical back portion to which one or more suction cups are attached and which comprises a nonskid material on the side that faces the vehicle window to minimize vertical and horizontal slippage of the pillow when in use.

U.S. Pat. No. 4,919,483 by Horkey, indicates a headrest for securing to the window in the cab of a truck, or to any supporting surface in other types of vehicles, employing a cushion of porous plastic material surrounded by a nonporous material. The cushion has a port extending through the casing and into the porous material. A valve is mounted on the casing to control air flow through the port upon head impact with the cushion and substantially closing the port upon inflow of air through the port and into the cushion after impact. Means are mounted on the cushion for affixing it t the window of the cab of the truck or other surfaces in other types of vehicles.

U.S. Pat. No. 5,317,772 by Pert, et al. references an inflatable pillow having fastening strips along one edge thereof is attachable to an external structure to enable easy attachment of the pillow to the structure, followed by inflation, and use by a user. Suction cups may also be provided along the pillow edge for attachment to a vertical glass window.

U.S. Pat. No. 5,054,855 by Williams, et al. discloses a headrest which is mounted to the inside rear window of a vehicle by attached suction cups which permit the headrest to be mounted, positioned, released and repositioned to the vehicle window adjacently behind the vehicle seats.

U.S. Pat. No. 4,770,466 by Pesterfield references a headrest includes recessed suction cups for detachably attaching the headrest to a support surface to substantially prevent the headrest from sagging away from the surface, and limit relative movement between the headrest and the surface.

While such efforts have been made in making pillow-type devices, many fail to provide compact/compactable pillows, pillows that may be adjusted for use, pillows that advantageously dangle pillows resistant to damage from coupling members, and/or modular systems. Further, many such devices are expensive, bulky, and/or cumbersome; leaving large unsightly marks on windows; and/or include many parts. Further, many are difficult to clean and/or are unsanitary.

What is needed is a pillow that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available travel pillows. Accordingly, the present invention has been developed to provide a travel pillow.

In one embodiment there is a pillow for coupling to a surface. The pillow may include one or more of the following: a first cushion of soft resilient material; a first cover that may enclose the cushion and may include a first corner portion; a second cover that may enclose the first cover, the second cover that may include an edge portion that may have a first aperture disposed therethrough; and a suction cup assembly that may be coupled to the first corner portion and may be disposed through the first aperture.

The suction cup assembly may include one or more of the following a suction cup configured to adhere to a surface; a release tab coupled to an edge of the suction cup; a neck extending from the suction cup; a nub coupled to the neck and having a larger dimension than a radius of the neck; a second cushion of soft resilient material disposed about the neck and between the first cover and the nub; and a rigid annular member disposed about the neck and between the second cushion and the nub, wherein the second cushion extends radially beyond the rigid annular member.

There may be a second aperture that may be disposed near the second corner. The second aperture may be selectably sealable and/or may be large enough to permit ingress and/or egress of the first cushion therethrough. The second aperture may w include a pair of hook and loop strips, each removably coupleable to the other. The rigid annular member may compress the second cushion. The second cushion may include foam rubber.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
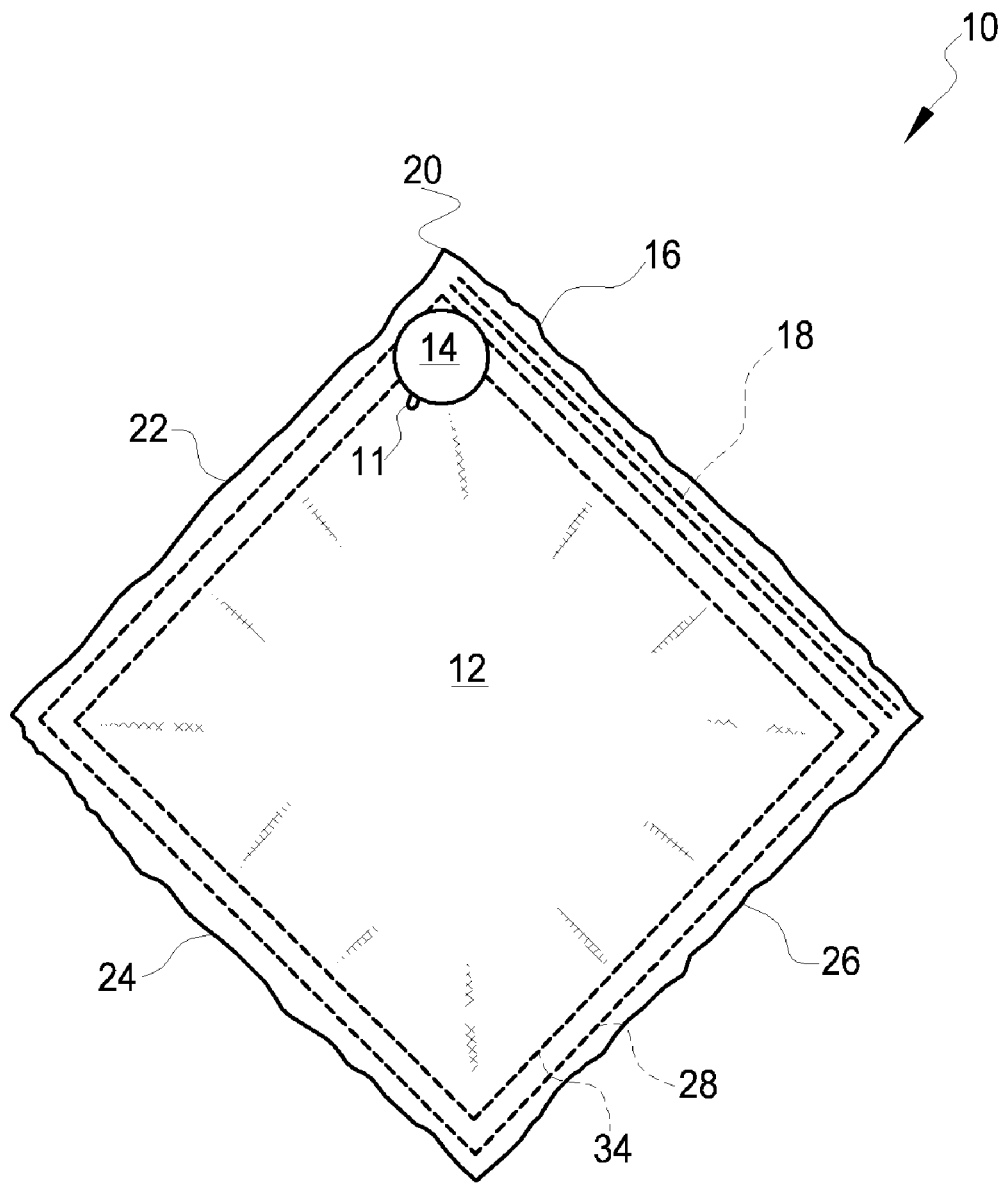
FIG. 1 illustrates a plan view of a travel pillow according to one embodiment of the invention.
Figure 2:
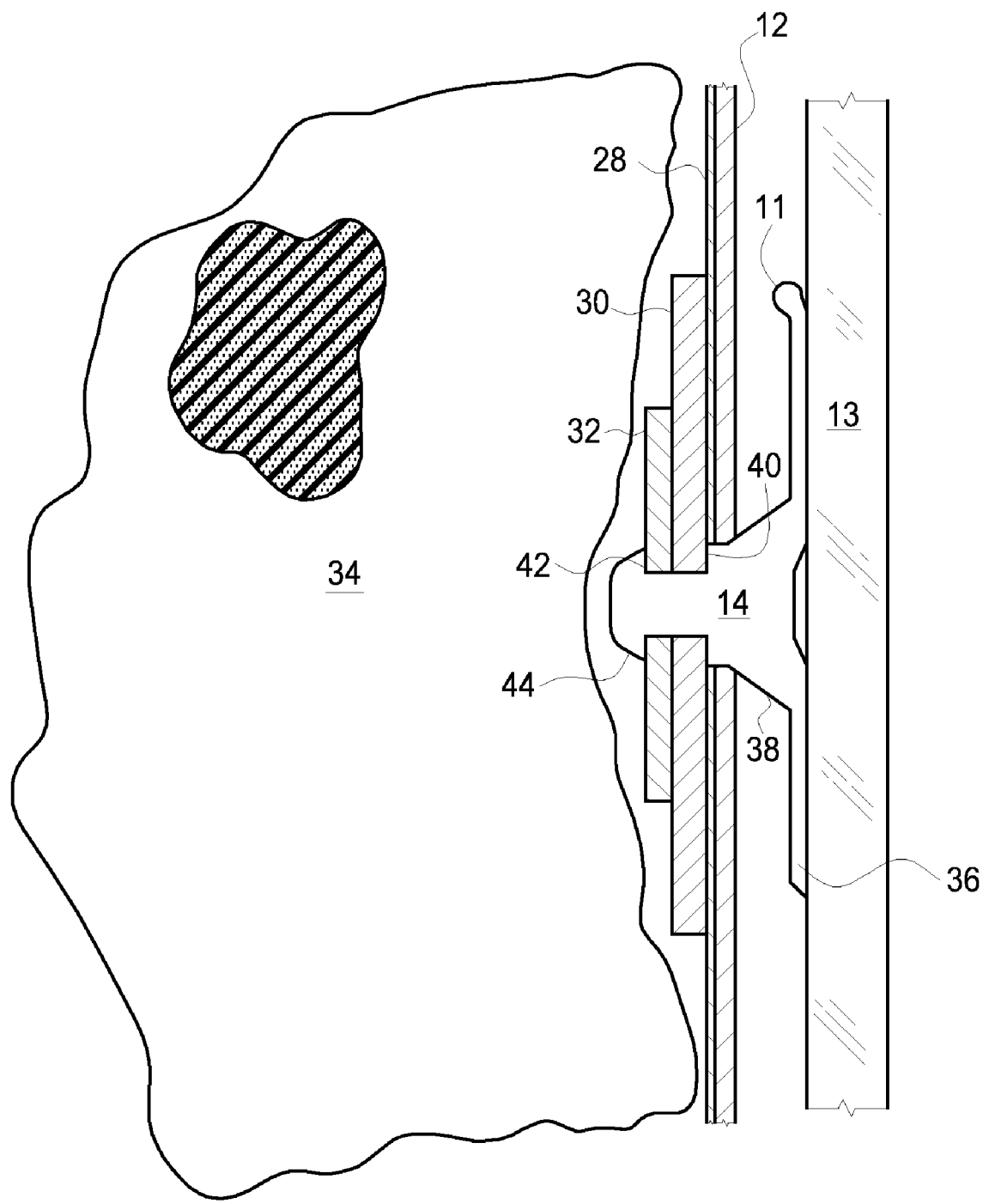
FIG. 2 illustrates a cross-sectional side view of a suction assembly in operation according to one embodiment of the invention.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended, Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to "one embodiment," "an embodiment," or similar language means that a particular feature, structure, or characteristic described in connection with the embodiment is included in at least one embodiment of the present invention. Thus, appearances of the phrases "one embodiment," "an embodiment," and similar language throughout this specification may, but do not necessarily, all refer to the same embodiment, different embodiments, or component parts of the same or different illustrated invention. Additionally, reference to the wording "an embodiment," or the like, for two or more features, elements, etc. does not mean that the features are related, dissimilar, the same, etc. The use of the term "an embodiment," or similar wording, is merely a convenient phrase to indicate optional features, which may or may not be part of the invention as claimed.

Each statement of an embodiment is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The independent embodiments are considered to be able to be combined in whole or in part one with another as the claims and/or art may direct, either directly or indirectly, implicitly or explicitly.

Finally, the fact that the wording "an embodiment," or the like, does not appear at the beginning of every sentence in the specification, such as is the practice of some practitioners, is merely a convenience for the reader's clarity. However, it is the intention of this application to incorporate by reference the phrasing "an embodiment," and the like, at the beginning of every sentence herein where logically possible and appropriate.

Figure 3:
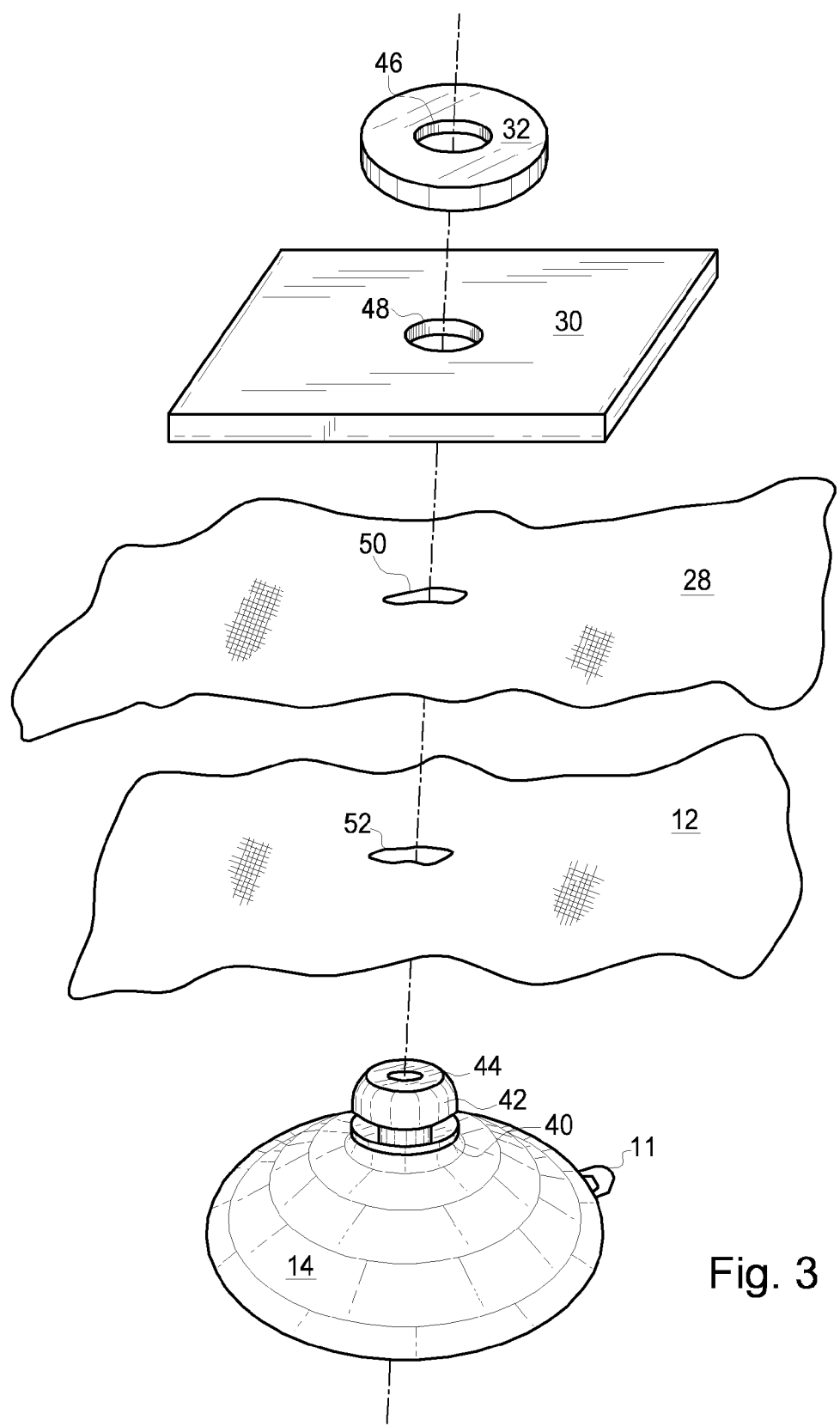
FIG. 3 illustrates an exploded perspective view of a suction assembly according to one embodiment of the invention.

Looking to the figures there is shown a pillow 10 for coupling to a surface 13. The illustrated pillow 10 includes: a first cushion 34 of soft resilient material; a first cover 28 that may enclose the first cushion 34; a second cover 12 that may enclose the first cover 28, the second cover 12 that may include an edge portion 20 that may have a first aperture 52 disposed therethrough; and a suction cup assembly that may be coupled to the first cover 28 and may be disposed through the first aperture 52, illustrated in FIG. 3.

The illustrated first cushion 34 is configured to provide comfort and/or support to a user thereof. Accordingly, it may include any material that provides such. Non-limiting examples include: batting, woven materials, feathers, chips, beads, beans, foam, rubber, and/or any combinations thereof.

The illustrated first cover 28 is configured to contain and/or protect the first cushion 34, and/or to anchor the suction assembly. Accordingly, the first cover 28 may include one or more sheets, pockets, pouches, envelopes, etc. of material such as but not limited to woven materials, plastics, rubbers, nettings, wraps, etc.

The illustrated second cover 12 is generally configured to provide an exterior appearance and/or texture and/or to protect the first cover 28 and/or first cushion 34 from damage and/or soiling from use. Accordingly, it is understood that the variety of materials used therein is plethoric. Further, there may be a great variety of second covers 12, especially wherein the second cover 12 is advantageously separable from the first cover 28, first cushion 34, and/or suction cup assembly. Still more, the second cover 12 may be advantageously cleaned separately.

In one embodiment, the second cover 12 is an envelope of soft woven material of a pleasant color and has a substantially square profile. The second cover 12 may include ornamentation, such as but not limited to embroidery, logos, printing, etc. There are a plurality of edges 16, 20, 22, 24, and 26, which edges may be corners. There may be an aperture 52 through the second cover 12 near one or more of the edges, thereby enabling coupling of the suction cup assembly to the second cover 12 near an edge. Accordingly, the pillow 10 may dangle from an edge, advantageously providing enhanced freedom of motion to the pillow 10, and enabling a user to move the pillow 10 substantially (enough to provide a plurality of comfortable configurations) without detaching the suction cup 14 from the surface 13. It is preferred that a second aperture 18 and associated sealing members/devices are disposed near the aperture 52 through which the suction cup assembly is disposed, thereby keeping such members/devices at a distance from the face and neck of a user, thereby enhancing comfort.

The illustrated first aperture 52 through the second cover 12 provides neck 38 access internal the second cover 12. Further, the first aperture 52 may be sized to allow the suction cup 14 to traverse the first aperture 52, such as by folding the suction cup 14 to reduce maximum dimensions to less than that of the first aperture 52. Accordingly, while in use the suction cup may be disposed through the first aperture 52 and may be later pulled through the first aperture 52 and subsequently through the second aperture 18 in the process of removing the second cover 12.

The illustrated suction cup 14 assembly includes: a suction cup 14 configured to adhere to a surface; a release tab 11 coupled to an edge of the suction cup 14; a neck 38 extending from the suction cup 14; a nub 44 coupled to the neck 38 and having a larger dimension than a radius of the neck 38; a second cushion 30 of soft resilient material disposed about the neck 38 and between the first cover 28 and the nub 44; and a rigid annular member 32 disposed about the neck 38 and between the second cushion 30 and the nub 44, wherein the second cushion 30 extends radially beyond the rigid annular member 32.

The illustrated suction cup 14 is configured to couple to a surface and includes a bell 36 configured to create a suction or vacuum. For the purposes of this application, suction cup includes vacuum cups, vacuum pads, suction cup spring suspensions, etc. Anver Corp. in Hudson, Mass. is an exemplary provider of suction cups. Exemplary surfaces to which a suction cup 14 may adhere include any substantially smooth surface, such as glass, finished wood, smooth metal, lacquer covered materials, ceramics, etc. There may be a release tab 11 coupled to the suction cup to help detach the suction cup 14 from the surface.

The illustrated release tab 11 is a protrusion extending from an edge of the suction cup 14. The tab 11 provides a gripping portion whereby a user may grasp the tab 11 and lift, thereby pulling an edge of the suction cup 14 free.

The illustrated neck 38 extends from the bell 36 of the suction cup 14 and extends all the way to the nub 44. In the illustrated neck 38 there are a plurality of different radii including a large change in radius at 40. In the illustrated example, the neck area between step 40 and nub boundary 42 provides a securing notch for containing the rigid annular member 32 and the second cushion 30. Thereby such may be fastened securely and wherein in one example the notch is smaller than the combined thicknesses of the rigid annular member 32 and the second cushion 30, a portion of the second cushion 30 is compressed, thereby enhancing the secure attachment.

Also, as shown in the figures, the apertures 50 and 52 of the first and second covers 28 and 12 respectively may be larger than the apertures 46 and 48 of the rigid annular member 32 and the second cushion 30 respectively to accommodate placement along the neck 38. Accordingly, the rigid annular member 32 and the second cushion 30 may be restricted to only the narrow portion of the neck 38. In one embodiment, one or more of the apertures 50 and 52 are only large enough to accommodate the narrow portion of the neck 38.

In one embodiment, the apertures 50 and/or 52 may be slits in the first and second covers 28 and 12 respectively. In another embodiment, the apertures 50 and/or 52 may include reinforced stitching.

The illustrated nub 44 is coupled to an end of the neck 38 and provides an enlarged portion configured to restrict access to and/or from the neck 38. The neck may be beveled as shown, thereby assisting access to the neck 38, but where not beveled near the neck 38 may substantially restrict egress therefrom. It is not necessary that the nub 44 be larger than the neck 38 in all dimensions, only that the nub 44 restrict motion traversing the nub 44.

The illustrated second cushion 30 is configured to provide a cushion for the suction cup assembly. Such advantageously may prevent damage to the first and/or second covers 28 and/or 12. Further, such may enhance coupling strength of the suction cup assembly together and/or to one or more other members.

In one embodiment, the second cushion 30 is foam rubber. It is understood that the second cushion 30 may include a variety of materials that are elastic, soft, resilient, and/or pliable or otherwise protective in nature, and/or any combination thereof. The illustrated second cushion 30 extends beyond a radius of the rigid annular member 32, thereby preventing the rigid annular member 32 from coming into direct contact with the first and/or second covers 28 and/or 12. Such protects the covers 28 and/or 12 during normal use of the pillow 10.

There is shown a second aperture 18 disposed near the edge 20. The second aperture 18 may be selectably sealable and/or may be large enough to permit ingress and/or egress of the first cushion 34 therethrough. The second aperture 18 may include a pair of book and loop strips, each removably coupleable to the other.

In operation, a user may remove the pillow 10 from a compacted position, such as being stuffed in a stuff bag or rolled tightly for storage. The suction cup 14 may then be coupled to a surface such as a window near a passenger seat of a vehicle. The pillow 10 then dangles therefrom for use by an individual.

Because the suction assembly is coupled near an edge, the pillow 10 dangles and may be moved about pivoting about the suction assembly. The pillow 10 may be rolled for doubling or more cushion material. During use, the head and neck of the user may contact the second cover 12, which is a soft pleasing material. The second cover 12 may be replaced as desired and/or washed, thereby keeping the pillow 10 clean and sanitary.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive, The scope of the invention is, therefore, indicated by the appended claim rather than by the foregoing description. All changes which come within the meaning and range of equivalency of the claims are to be embraced within their scope.

For example, although the figures illustrate a second cushion 30 having a rectangular profiles one skilled in the art would understand that the appropriate shapes for fulfilling the desired function are plethoric and include shapes such as circles, ellipses, triangles, other polygons, irregular shapes, and combinations thereof.

Additionally, although the figures illustrate an annular member that includes concentric circles and is a washer, it is understood that such is not strictly limited to circles, but may include a plethora of other shapes and that such may be adapted to neck shapes. For example, where there is a neck 38 having a triangular cross section, a triangular annular member may be appropriate. Further, it is not required that the shape of the hole of the annular member matches the exterior shape of the annular member, nor that either is a circle.

More, while only a single suction cup is illustrated, it is understood that there may be more than one suction cup and/or suction cup assembly included.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. A pillow for coupling to a surface, comprising:
    a first cushion of soft resilient material;
    a first cover enclosing the first cushion;
    a second cover enclosing the first cover, the second cover including an edge portion having a first aperture disposed therethrough; and
    a suction cup assembly coupled to the first cover and disposed through the first aperture,
        wherein the suction cup assembly comprises:

a suction cup configured to adhere to a surface;

a neck extending from the suction cup;

a nub coupled to the neck and having a larger dimension than a radius of the neck;

a second cushion of soft resilient material disposed about the neck and between the first cover and the nub; and a rigid annular member disposed about the neck and between the second cushion and the nub, wherein the second cushion extends radially beyond the rigid annular member.

2. The pillow of claim 1, wherein the rigid annular member compresses the second cushion.

3. The pillow of claim 2, wherein the second cushion comprises foam rubber.

4. The pillow of claim. 1, wherein the suction cup assembly further comprises a release tab coupled to an edge of the suction cup.

5. The pillow of claim 1, wherein the second cover further comprises a second aperture disposed near the second corner.

6. The pillow of claim 5, wherein the second aperture is selectably sealable and large enough to permit ingress and egress of the first cushion therethrough.

7. The pillow of claim 6, wherein the second aperture comprises a pair of hook and loop strips, each removably coupleable to the other.

8. A pillow for coupling to a surface, comprising:

a first cushion of soft resilient material;

a first cover enclosing the first cushion;

a second cover enclosing the first cover, the second cover including an edge portion having a first aperture disposed therethrough; and a suction cup assembly coupled to the first cover and disposed through the first aperture, wherein the suction cup assembly includes:

a suction cup configured to adhere to a surface;

a neck extending from the suction cup;

a nub coupled to the neck and having a larger dimension than a radius of the neck;

a second cushion of soft resilient material disposed about the neck and between the first cover and the nub; and a rigid annular member disposed about the neck and between the second cushion and the nub, wherein the second cushion extends radially beyond the rigid annular member.

9. The pillow of claim 8, wherein the rigid annular member compresses the second cushion.

10. The pillow of claim 9, wherein the second cushion comprises foam rubber.

11. The pillow of claim 8, wherein the suction cup assembly further comprises a release tab coupled to an edge of the suction cup.

12. The pillow of claim 8, wherein the second cover further comprises a second aperture disposed near the second corner.

13. The pillow of claim 12, wherein the second aperture is selectably sealable and large enough to permit ingress and egress of the first cushion therethrough.

14. The pillow of claim 13, wherein the second aperture comprises a pair of hook and loop strips, each removably coupleable to the other.

15. A pillow for coupling to a surface, consisting essentially of:

a first cushion of soft resilient material;

a first cover enclosing the first cushion;

a second cover enclosing the first cover, the second cover including an edge portion having a first aperture disposed therethrough; and a suction cup assembly coupled to the first cover and disposed through the first aperture, wherein the suction cup assembly includes:

a suction cup configured to adhere to a surface;

a neck extending from the suction cup;

a nub coupled to the neck and having a larger dimension than a radius of the neck;

a second cushion of soft resilient material disposed about the neck and between the first cover and the nub; and a rigid annular member disposed about the neck and between the second cushion and the nub, wherein the second cushion extends radially beyond the rigid annular member.

\* \* \* \* \*